Feb. 5, 1924.
S. MAY
1,482,477
CASING AND METHOD OF MAKING SAME
Filed Dec. 3, 1921
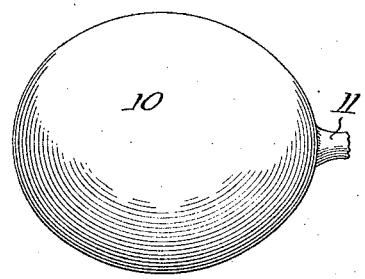
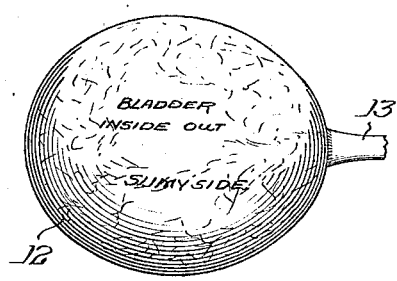
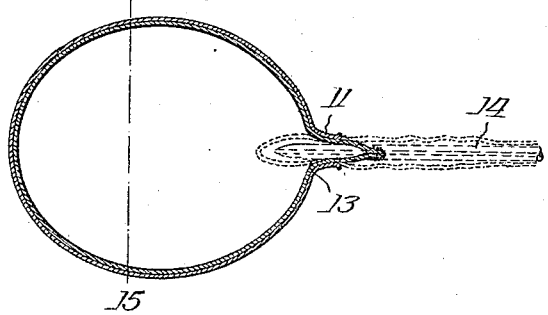
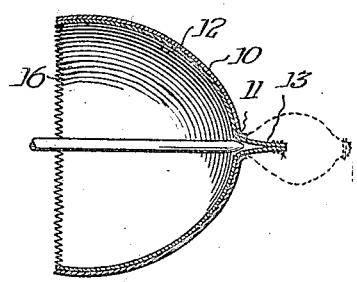
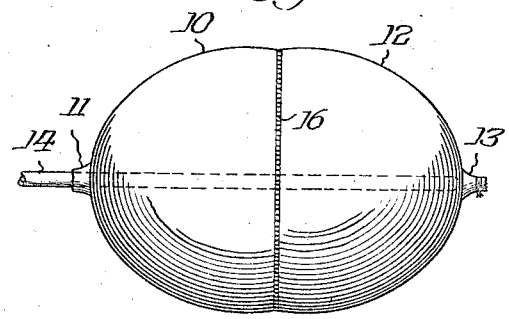
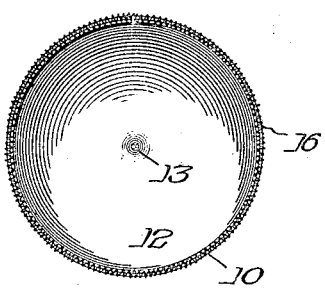
Inventor
Solomon May Patented Feb. 5, 1924.

1,482,477

UNITED STATES PATENT OFFICE.

SOLOMON MAY, OF CHICAGO, ILLINOIS.

CASING AND METHOD OF MAKING SAME.

Application filed December 3, 1921. Serial No. 519,790.

*To all whom it may concern:*

Be it known that I, SOLOMON MAY, a citizen of the United States, residing at Chicago, in the county of Cook and State of Illinois, have invented certain new and useful Improvements in Casings and Methods of Making Same, of which the following is a specification.

The present invention relates to casings and methods of making same.

In manufacturing casings for sausages and similar articles, it is common practice to use the bladders, intestines, or other saclike organs of animals. Inasmuch as certain sizes and shapes are demanded by the trade, the field of choice among such organs is limited.

An object of the present invention is to provide a method of manufacturing casings whereby two of such organs may be combined to provide a casing of the requisite size and shape.

A further object is to provide a method whereby organs such as referred to above may be conveniently handled.

A further object is to provide a casing built up of a plurality of animal organs which will have improved attractiveness and which will conform to the requirements of the trade.

Further objects will appear as the description proceeds.

Referring to drawings,

Figure 1 represents an animal organ, which may be a bladder which is too small for the trade;

Figure 2 represents a bladder similar to that shown in Figure 1, but turned inside out whereby the slimy side is outermost;

Figure 3 is a view in section illustrating a bladder such as shown in Figure 2 mounted within a bladder such as shown in Figure 1, an intermediate stage in the process of inserting the inside bladder being illustrated in dotted lines;

Figure 4 is a sectional view of a sausage casing at an intermediate stage of its manufacture;

Figure 5 is an end view of the embodiment shown in Figure 4;

Figure 6 is a view of the improved fabricated casing.

The numeral 10 illustrates a sac-like membranous member, which may be the bladder or part of the intestines of an animal such as a hog. Said member 10, which for convenience herein will be termed a bladder, is imperforate except for the neck 11 which provides access to the interior of said bladder. A second bladder is illustrated in Figure 2, said second bladder being turned inside out, whereby the slimy side is outermost. The body of the bladder illustrated in Figure 2 is indicated by the numeral 12 and the neck thereof is indicated by the numeral 13. Any preferred means may be used for turning a bladder inside out, but it will be found convenient to use a tube, carrying compressed air, for this purpose.

Figure 3 illustrates a bladder which has been turned inside out mounted within a bladder which is in its normal condition. Any preferred method may be used for inserting the one bladder within the other. A preferred method is illustrated in Figure 3, in which a tube, indicated by the numeral 14, may be inserted through the neck 13 of the bladder illustrated in Figure 2 and the closed end of said bladder inserted within the neck 11 of the bladder illustrated in Figure 1. If difficulty is encountered in this operation, air under pressure may be applied to the tube 14 and said air will cause the bladder 11 to enter the bladder 10. In any event, whether or not air under pressure is used in the inserting operation, it is preferred to use air under pressure to inflate the innermost bladder whereby the two bladders are forced into intimate contact with one another. By this method the result is produced that the one bladder fits tightly within the other, regardless of differences in natural contour. Up to this point the bladder will be handled in moist condition. The natural flexibility of said bladders will accommodate differences in size and contour.

After the two bladders have been mounted one within the other the neck 13 will be tied to prevent escape of air and said bladders will be allowed to dry, after which that end of the composite structure which is opposite to the neck 11 will be cut away along the line indicated by the numerals 15—15. The remaining parts of the two bladders will then be sewed or otherwise attached together along a seam indicated by the numeral 16. The fact that the two bladders are in such intimate contact, and therefore fit together very well, renders it a simple matter to sew the two bladders together. The resulting structure is a cup-shaped structure having an apex located at the neck 11.

The composite structure having the cup-shape formation is then soaked in water whereby to loosen the two bladders, the air tube is then inserted on the inside of the cup, and the inside bladder 12 is then blown out through the neck 11, the structure being thereby turned so that the slimy side is outermost. The resulting structure is illustrated in Figure 6, the tube being shown within the structure.

It will be obvious that instead of mounting the two bladders with their slimy sides in contact, they may be mounted with their other sides in contact, attached to form a cup-shape structure, and the inner bladder may be pulled or pushed out through the large end of the cup-shape structure, leaving the seam on the outside.

It will be obvious, also, that two bladders may have their end portions cut away while moist and may be sewed together along the cut edges to form a fabricated casing. These and other methods may be employed without departing from the spirit of the invention.

The small ends of the bladders may be sewed together, if preferred, to make small casings, or may be used in any of the well known ways in which the material of bladders is utilized.

The improved method described herein has the advantage that only one tying operation is required on each fabricated structure, the inner bladder only being tied at its neck portion.

According to this method the subsequent handling of the composite structure is simplified for the casing maker for the reason that he does not have to untie any strings, and is simplified for the sausage maker for the reason that one end of the composite structure is already tied, leaving only the filling opening. It may be noted that the term "sac-like" as used herein is intended to refer to a structure having either one aperture or a plurality of apertures.

The resulting fabricated structure is materially longer than a casing which consists of only one of the bladders from which said fabricated casing is made. There is considerable latitude in the location of the line 15—15 along which the cutting is done, for the reason that the flexibility and expansibility of the bladders permits stretching under the influence of the compressed air. The resulting casing is very sturdy and permits the use of small bladders in the manufacture of casings of a size to conform to the requirements of the trade.

The invention is also applicable to intestines, for the reason that it permits the fabrication of casings from the most suitable parts of said intestines.

One embodiment of the present invention has been described in detail. Many modifications will occur to those skilled in the art. It is intended in this patent to cover all such modifications that fall within the scope of the invention as defined by the appended claims.

I claim:

1. The method of making casings which consists of inserting a sac-like member having an outer slimy side within a sac-like member having a slimy inner side, forcing said slimy sides into intimate contact with one another, attaching said members together along a seam, parts of said members being removed along one side of said seam, and turning the resulting structure so that the slimy side is outermost.

2. The method of making casings which consists of inserting a sac-like member having a slimy outer side within a sac-like member having a slimy inner side, forcing said slimy sides into intimate contact with one another by compressed air, allowing said members to dry while clinging together, cutting away one end of the composite structure, attaching said members together by stitching, and turning the resulting composite structure so that the slimy side is outermost.

3. The method of making casings which consists of inserting a sac-like member having a slimy outer side within a sac-like member having a slimy inner side, forcing said slimy sides into intimate contact with one another by compressed air, allowing said members to dry while clinging together, cutting away one end of the composite structure, attaching said members together, soaking said members, and turning said composite structure whereby the slimy side is outermost.

4. A casing comprising a pair of sac-like membranous members, each having an end cut away to provide a cup-shape member, said cup-shape members being attached together to form an elongated sac-like member.

5. A step in the art of the manufacture of casings which consists of providing two sac-like members having contracted neck portions, inserting one of said members through the neck of the other of said members, and forcing said one member into said other member by means of compressed air.

6. A step in the art of casing manufacture which consists of providing two sac-like members, each having a single opening, inserting a compressed air tube within one of said members, inserting said tube and member within the opening of the other of said members, and permitting compressed air to force said one member into intimate contact with said other member.

7. A step in the art of manufacturing casings which consists of providing a cup-shape structure comprising two membranous members sewed together along the rim of said cup-shape structure, said structure having an apex, the outer of said members having an aperture at said apex, applying a compressed air tube on the interior of said cup-shape composite structure toward said apex whereby to force the inner membrane out through said neck portion to provide a sac-like member.

8. The art of manufacturing casings, which consists in providing two sac-like membranous members, each having a slimy side, mounting one of said members within the other whereby said slimy sides are in contact, forcing said slimy sides into intimate relation with one another, allowing said membranes to dry, cutting away portions of said membranes and stitching together the remaining portions of said membranes to form a cup-shape composite structure, forcing the innermost of said membranes through an aperture in the outermost of said membranes through the apex of said cup-like structure whereby to provide an elongated sac-like structure.

9. The method of making casings, which consists of inserting a sac-like member within another sac-like member, each of which has only one opening, forcing said members into intimate contact with one another while moist, said openings being kept coincident, allowing said members to dry, cutting off the end of the resulting composite structure to form a cup-like structure, sewing said two members together along the edge of the said cup-like structure, and parting the intimately contacting surfaces of said members to form a fabricated casing.

10. The method of making casings which consists of inserting a sac-like member within a second sac-like member, forcing said members into intimate contact with one another by means of compressed air, allowing said members to dry while clinging together under the pressure of compressed air, cutting away one end of the resulting composite structure to form a cup-shape structure, sewing said members together along the edge of said cup-shape member, and parting the intimately contacting surfaces of said members to form a fabricated casing.

11. The method of making casings which consists of inserting a sac-like member having a slimy outer side within a sac-like member having a slimy inner side, forcing said slimy sides into intimate contact with one another by compressed air and allowing said members to dry while clinging together under the pressure of said compressed air, cutting away one end of the resulting composite structure to form a cup-shape structure, attaching said members together by sewing along the edge of said cup-shape structure, soaking said structure and forcing the innermost of said members through an aperture in the outermost of said members whereby to form a fabricated casing with the slimy side outermost.

12. The method of making casings which consists of inserting a sac-like member having a slimy outer side within a second sac-like member having a slimy inner side, each of said members having only one opening, forcing said slimy sides into intimate contact with one another, said openings being kept coincident, allowing said members to dry under the pressure of compressed air, cutting off the end of the resulting composite structure to form a cup-shape structure, sewing said two members together along the edge of said cup-shape structure, soaking said members and forcing the innermost of said members out through the end of the outermost of said members to form a fabricated casing with the slimy side outermost.

13. A step in the art of the manufacture of casings, which consists of providing two sac-like members, each having a single opening, and inserting one of said members through the opening of the other of said members.

14. A step in the art of the manufacture of casings, which consists of providing two sac-like members, each having a single opening, inserting one of said members through the opening of the other of said members, and securely closing the opening of the innermost of said members leaving the outermost of said members open.

15. A step in the art of the manufacture of casings, which consists of providing two sac-like members, each having a single opening, inserting one of said members through the opening of the other of said members and forcing said one member into intimate contact with said other member by means of air under pressure.

16. A step in the art of manufacturing casings, which consists of providing a cup-shape structure comprising two membranous members sewed together along the rim of said cup-shape structure, said structure having an apex, the outer having an aperture of said apex, forcing the inner of said members out through the opening of the outer of said members to provide a sac-like member.

17. The method of making casings, which consists of inserting a sac-like member within a second sac-like member, forcing said members into intimate contact with one another, attaching said members together along a seam, parts of said members removed along one side of said seam to form a cup-shape structure, and parting the intimately contacting surfaces of said members to provide a sac-like structure.

18. The method of making casings which consists of inserting a sac-like member having a slimy outer side within a sac-like member having a slimy inner side, forcing said slimy sides into intimate contact with one another, attaching said members together along a seam and removing parts of said members along one side of said seam.

19. The method of making casings which consists of inserting a sac-like member having a slimy outer side within a sac-like member having a slimy inner side, forcing said slimy sides into intimate contact with one another by compressed air, allowing said members to dry while clinging together, cutting away one end of the composite structure and attaching said members together by stitching.

20. The method of making casings which consists of inserting a sac-like member having a slimy outer side within a sac-like member having a slimy inner side, forcing said slimy sides into intimate contact with one another by compressed air, allowing said members to dry while clinging together, cutting away one end of the composite structure, attaching said members together and soaking said members to part the intimately contacting sides thereof.

Signed at Chicago, Illinois, this 1st day of December, 1921.

SOLOMON MAY.